US009392545B2

(12) United States Patent
Preiszler et al.

(10) Patent No.: US 9,392,545 B2
(45) Date of Patent: Jul. 12, 2016

(54) POWER-EFFICIENT WIRELESS DATA TRANSFER

(75) Inventors: Eitan Preiszler, D N Menashe (IL); Rafi Raskin, Haifa (IL); Itzik Shahar, Ha (IL)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 13/993,482

(22) PCT Filed: Dec. 28, 2011

(86) PCT No.: PCT/US2011/067651
§ 371 (c)(1),
(2), (4) Date: Jul. 2, 2014

(87) PCT Pub. No.: WO2013/100994
PCT Pub. Date: Jul. 4, 2013

(65) Prior Publication Data
US 2014/0315491 A1 Oct. 23, 2014

(51) Int. Cl.
*H04W 76/00* (2009.01)
*H04W 52/02* (2009.01)
*H04W 76/04* (2009.01)
*H04W 76/02* (2009.01)

(52) U.S. Cl.
CPC ........ *H04W 52/0235* (2013.01); *H04W 76/025* (2013.01); *H04W 76/04* (2013.01); *H04W 76/023* (2013.01); *Y02B 60/50* (2013.01)

(58) Field of Classification Search
CPC ....... Y02B 60/50; H04W 76/00; H04W 4/008
See application file for complete search history.

(56) References Cited

U.S. PATENT DOCUMENTS 7,546,404 B2 * 6/2009 Yeh ................... H04W 72/1215
370/338
8,848,848 B2 * 9/2014 Nowshadi ................ H04L 7/02
375/354

(Continued)

FOREIGN PATENT DOCUMENTS

WO WO-2013100994 A1 7/2013

OTHER PUBLICATIONS

"International Application Serial No. PCT/US2011/067651, Search Report mailed Aug. 31, 2012", 3 pgs.

(Continued)

*Primary Examiner* — Cindy Trandai
(74) *Attorney, Agent, or Firm* — Schwegman Lundberg & Woessner, P.A.

(57) ABSTRACT

Some embodiments herein include at least one of systems, methods, and devices for power-efficient data transfer between two communicating devices. The two devices establish two wireless links between each other; the first link using a low-power/low-throughput protocol and utilized to maintain a second link, the second link using a high-power/high-throughput protocol. When first device data is available for transmission, the first device instructs the second device via the first link to switch to the second link for data reception. The first device then transmits data to the second device via the second link. When the transmission is complete, both devices switch back to using the first link to maintain their connection to each other. In some embodiments, the first device may be a Human Interface device and the second device may be a Bluetooth controller of a computing device.

20 Claims, 4 Drawing Sheets

(56) References Cited

U.S. PATENT DOCUMENTS

| | | | |
|---|---|---|---|
| 2004/0116075 A1* | 6/2004 | Shoemake | H04W 28/10 455/41.2 |
| 2004/0266494 A1* | 12/2004 | Ruuska | H04W 52/0216 455/574 |
| 2005/0213510 A1* | 9/2005 | Wakumoto | H04L 45/28 370/252 |
| 2006/0030266 A1* | 2/2006 | Desai | H04W 16/14 455/41.2 |
| 2006/0092864 A1* | 5/2006 | Gupta | H04L 67/00 370/278 |
| 2006/0292987 A1* | 12/2006 | Ophir | H04W 72/1215 455/41.2 |
| 2008/0139119 A1* | 6/2008 | Behzad | H04B 1/0057 455/41.2 |
| 2008/0166967 A1 | 7/2008 | Mckillop | |
| 2008/0238807 A1* | 10/2008 | Ibrahim | H01Q 21/29 343/876 |
| 2008/0247445 A1* | 10/2008 | Guo | H04B 1/406 375/220 |
| 2008/0318630 A1* | 12/2008 | Gil | H04W 72/1215 455/561 |
| 2009/0137206 A1* | 5/2009 | Sherman | H04W 16/14 455/41.2 |
| 2010/0039982 A1* | 2/2010 | Itagaki | H04W 40/22 370/315 |
| 2010/0226348 A1* | 9/2010 | Thoukydides | H04B 1/406 370/338 |
| 2010/0302979 A1* | 12/2010 | Reunamaki | H04M 1/7253 370/311 |
| 2011/0021142 A1* | 1/2011 | Desai | H04W 8/005 455/41.2 |
| 2011/0228749 A1 | 9/2011 | Taghavi Nasrabadi et al. | |
| 2011/0299510 A1* | 12/2011 | Kim | H04B 1/406 370/338 |
| 2011/0319020 A1* | 12/2011 | Desai | H04L 63/02 455/41.2 |
| 2012/0046000 A1* | 2/2012 | Gao | H04W 72/02 455/73 |
| 2012/0052802 A1* | 3/2012 | Kasslin | H04W 48/12 455/41.2 |
| 2012/0220351 A1* | 8/2012 | Kerai | H04W 52/0229 455/574 |
| 2012/0257561 A1* | 10/2012 | Redding | H04L 12/1827 370/312 |
| 2012/0257604 A1* | 10/2012 | Honkanen | H04W 4/023 370/338 |
| 2012/0263220 A1* | 10/2012 | Li | H04W 56/00 375/224 |

OTHER PUBLICATIONS

"International Application Serial No. PCT/US2011/067651, Written Opinion mailed Aug. 31, 2012", 4 pgs.

Bit, A, et al., "Comparative Analysis of Bluetooth 3.0 with UWB and Certified Wireless-USB Protocols", Proceedings of 2010 IEEE International Conference on Ultra-Wideband (ICUWB2010), vol. 2, (Sep. 23, 2010), 1-4.

"International Application Serial No. PCT/US2011/067651, International Preliminary Report on Patentability mailed Jul. 10, 2014", 6 pgs.

* cited by examiner

POWER-EFFICIENT WIRELESS DATA TRANSFER

CLAIM OF PRIORITY

This application is a U.S. National Stage Application under 35 U.S.C. 371 of International Application No. PCT/US2011/067651, filed Dec. 28, 2011, which is hereby incorporated by reference in its entirety.

TECHNICAL FIELD

Embodiments pertain to wireless communications. Some embodiments relate to communications with short-range wireless devices, such as Bluetooth devices.

BACKGROUND

Many Bluetooth devices, such as mice, keyboards, etc., are characterized by short, high-throughput bursts of data and long, idle periods of no data transmission. The Bluetooth Low Energy (BLE) technology consumes little power but has low throughput. The classic Bluetooth technology, which uses either the Basic Rate (BR) or Enhanced Data Rate (EDR) modes, can have high throughput by consuming a significant amount of power.

Thus, what is needed is a system and method for communicating with a higher throughput and lower power consumption.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
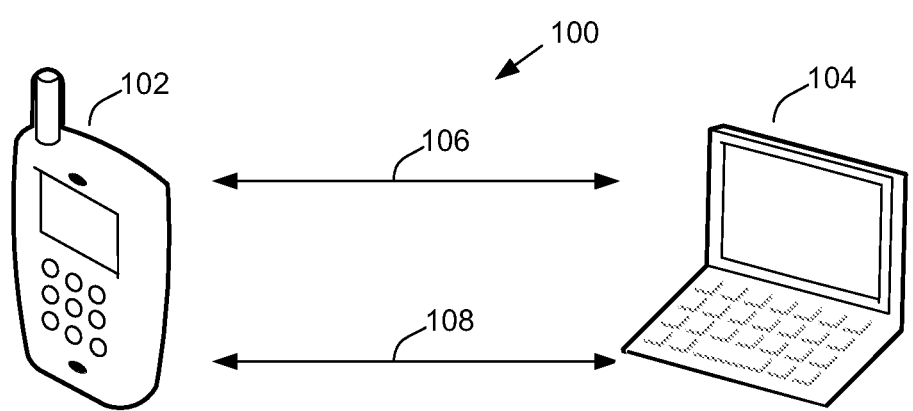
FIG. 1 illustrates an operational environment of Bluetooth devices for power-efficient data transfer in accordance with some embodiments.

FIG. 1 illustrates an operational environment of Bluetooth devices for power-efficient data transfer in accordance with some embodiments. As shown in FIG. 1, a first 102 and second 104 communication devices in accordance with some embodiments of the invention. In accordance with some embodiments, the first communication device 102 may establish two wireless links 106 & 108 with the second communication device 104. The first wireless link 106 may be a low-throughput, low-energy link and the second wireless link 108 may be a high-throughput, high-energy link, although the scope of the invention is not limited in this respect. The first device 102 may then place the second wireless link 108 into an inactive state by sending an appropriate command via the first wireless link 106 to the second device 104. When the first device 102 has data to transmit to the second device 104, the first device 102 may activate the second wireless link 108 by sending an appropriate command via the first wireless link 106 to the second device 104, the command instructing second device 104 to switch its reception from the first wireless link 106 to the second wireless link 108. Upon receipt of an acknowledgement of the command from the second device 104, the first device 102 may switch its antenna to using the second wireless link 108 and may transmit data via the second wireless link 108 to the second device 104.

In some embodiments, first device 102 may be a Human Interface Device (HID) such as mouse, a keyboard, touchscreen, a personal digital assistant (PDA), a laptop or portable computer with wireless communication capability, a web tablet, a wireless or cellular telephone, a wireless headset, a pager, an instant messaging device, a digital camera, an access point, a television, a medical device (e.g., a heart rate monitor, a blood pressure monitor, etc.), or other device that may receive and/or transmit information wirelessly, although the scope of the invention is not limited in this respect.

In some embodiments, second device 104 may be a Bluetooth controller of a computing device such as a personal digital assistant (PDA), a laptop or portable computer with wireless communication capability, a web tablet, a wireless or cellular telephone, or other device that may receive and/or transmit information wirelessly, although the scope of the invention is not limited in this respect.

In some embodiments, the first and second wireless links may be implemented in accordance with a frequency-hopping spread spectrum (FHSS) communication technique, although the scope of the invention is not limited in this respect. In some embodiments, first wireless link 106 may communicate using the Bluetooth Low Energy (BLE) protocol, and the second wireless link 108 may communicate using the Bluetooth Basic Rate/Enhanced Data Rate (BR/EDR) protocol, although the scope of the invention is not limited in this respect.

Upon data transfer completion, first device 102 may wait for the passage of a preset timeout period. Upon passage of the preset timeout period, first device 102 may then revert to using the first wireless link 106 and place the second wireless link 108 into an inactive state.

First device 102 synchronizes its clock with the clock of second device 104 by transmitting to and receiving from second device 104, via the first wireless link 106, appropriate transmissions of a clock-synchronizing protocol. These transmissions also serve to maintain the active state of first wireless link 106.

In some embodiments, the first wireless link 106 is configured to use a lower duty cycle than second wireless link 108, although the scope of the invention is not limited in this respect.

Figure 2:
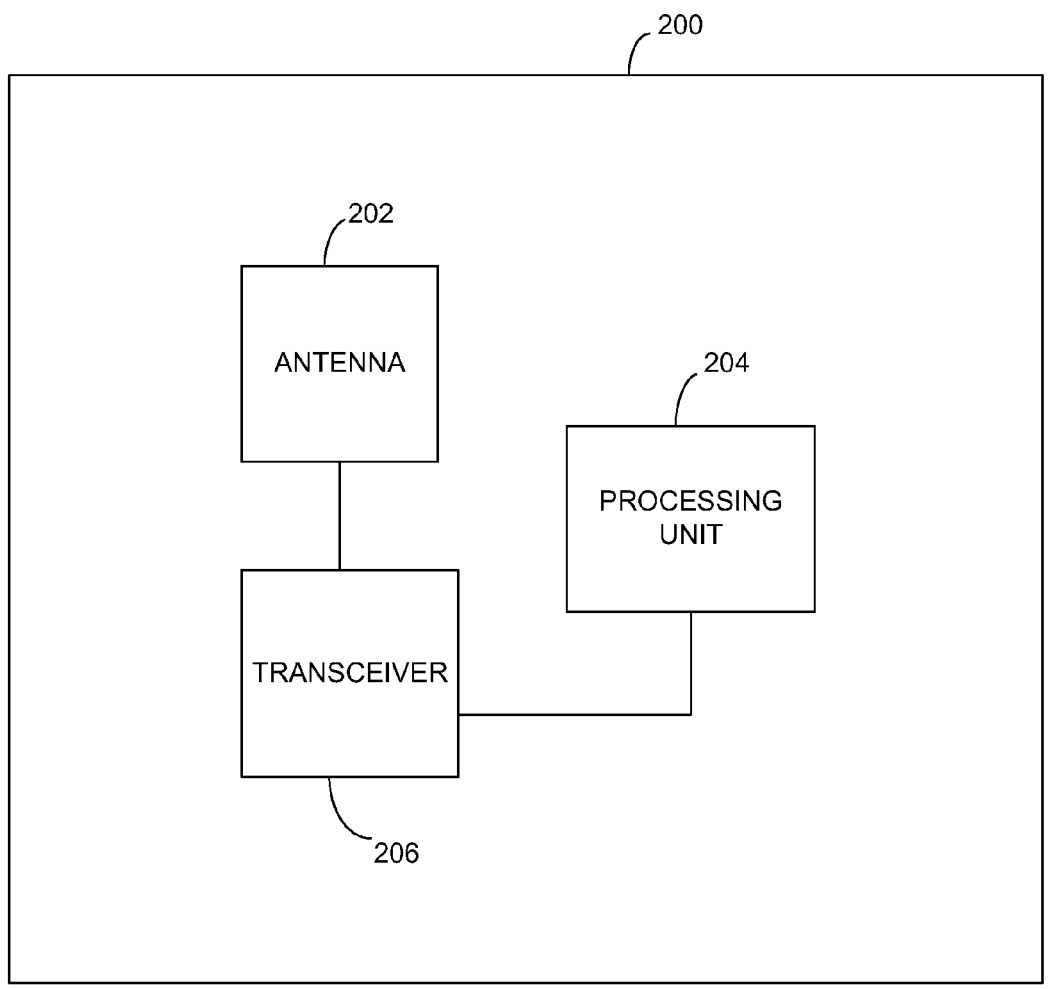
FIG. 2 is a functional block diagram of a Bluetooth device in accordance with some embodiments.

FIG. 2 is a functional block diagram of a Bluetooth device in accordance with some embodiments. Device 200 may include one or more antennas 202, a transceiver 206 and processing unit 204. Device 200 may be suitable for use as device 102. In accordance with embodiments, the transceiver 206 may be configured by the processing unit 204 to switch between BLE wireless link 106 and BR/EDR wireless link 108 according to the above-described method. In one embodiment, device 200 may dedicate one antenna 202 to the BLE wireless link 106 and dedicate another antenna 202 to the BR/EDR wireless link 108. In another embodiment, device 200 may have a single antenna 202 and use transceiver 206 to switch the antenna 202 between the BLE wireless link 106 and the BR/EDR wireless link 108.

Figure 3:
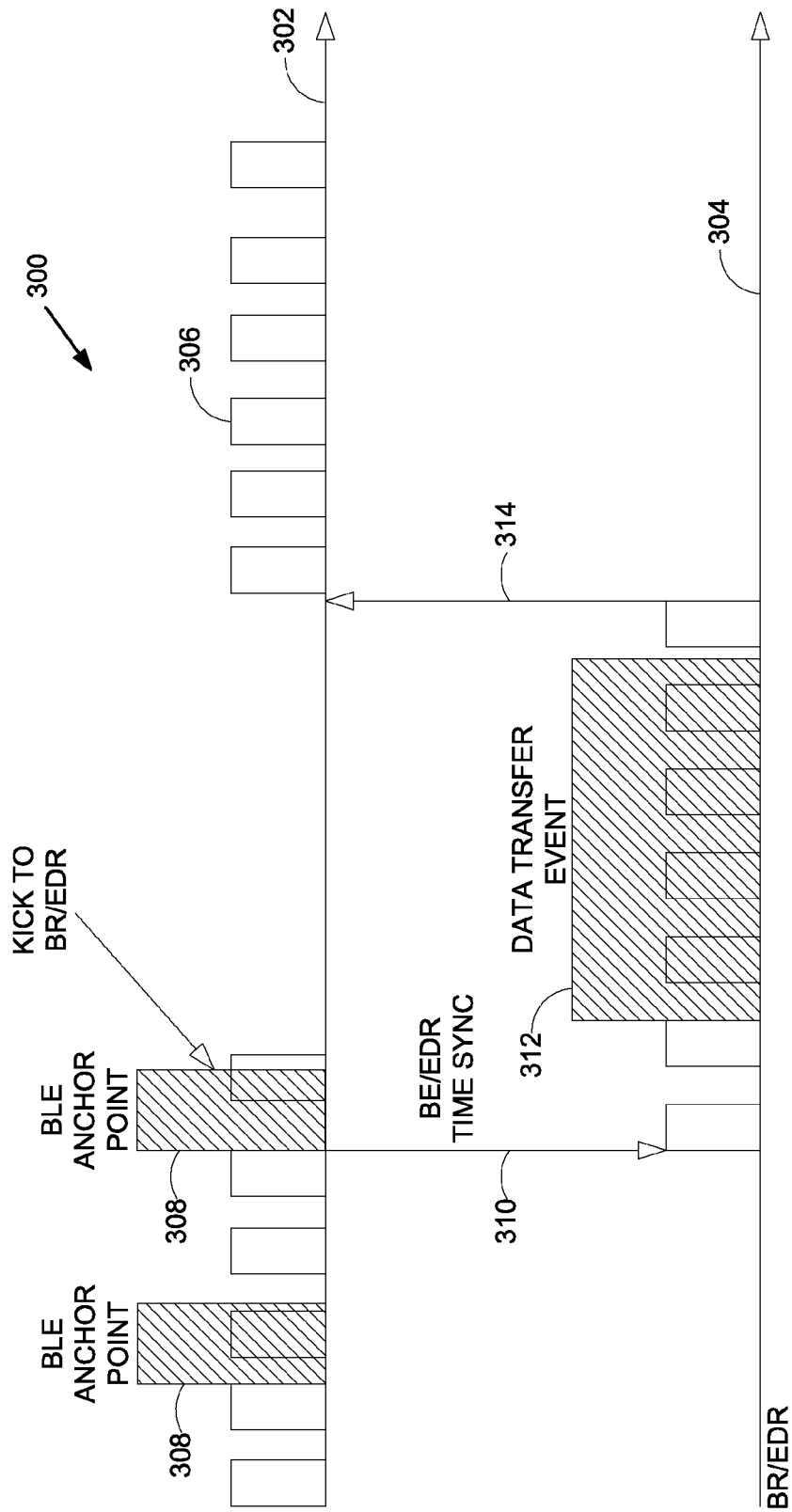
FIG. 3 illustrates an example of switching from using the BLE link to the BR/EDR link in accordance with some embodiments.

FIG. 3 illustrates an example of switching from using the BLE link to the BR/EDR link in accordance with some embodiments. Line 302 represents a segment of time for the BLE wireless link 106 and line 304 represents the same segment of time for the BR/EDR wireless link 108. Time slots 306 represent segments of time when transmission may occur between first Bluetooth device 102 and second Bluetooth device 104. First Bluetooth device 102 periodically synchronizes its clock with second Bluetooth device 104. First Bluetooth device 102 also periodically synchronizes its radio frequencies with second Bluetooth device 104. In some embodiments, the synchronization of clocks and radio frequencies may occur at the same time; in other embodiments, the synchronization of clocks and radio frequencies may occur at different times.

BLE anchor points 308 represent the start of a possible connection event. In one embodiment, second Bluetooth device 104 listens at the beginning of BLE anchor point 308 for a command 310 from first Bluetooth device 102 to switch from communicating via the BLE link 106 to communicating via the BR/EDR link 108. If no command 310 is received by second Bluetooth device 104 at the beginning of a BLE anchor point 308, then second Bluetooth device 104 waits until the next BLE anchor point 308 to listen for the command 310.

In some embodiments, when second Bluetooth device 104 receives a command 310 from first Bluetooth device 102 at the beginning of BLE anchor point 308, second Bluetooth device 104 may send first Bluetooth device 102 an acknowledgement via the BLE link 106. The first Bluetooth device 102 may then switch communication from the BLE link 106 to the BR/EDR link 108. First Bluetooth device 102 may then transmit data 312 to the second Bluetooth device 104 via BR/EDR link 108. Upon completion of data transmission 312 by the first Bluetooth device 102 to the second Bluetooth device 104 via the BR/EDR link 108, first Bluetooth device 102 and second Bluetooth device 104 may wait for an appropriate period of time, and may switch 314 from communicating via the BR/EDR link 108 to communicating via the BLE link 106.

Figure 4:
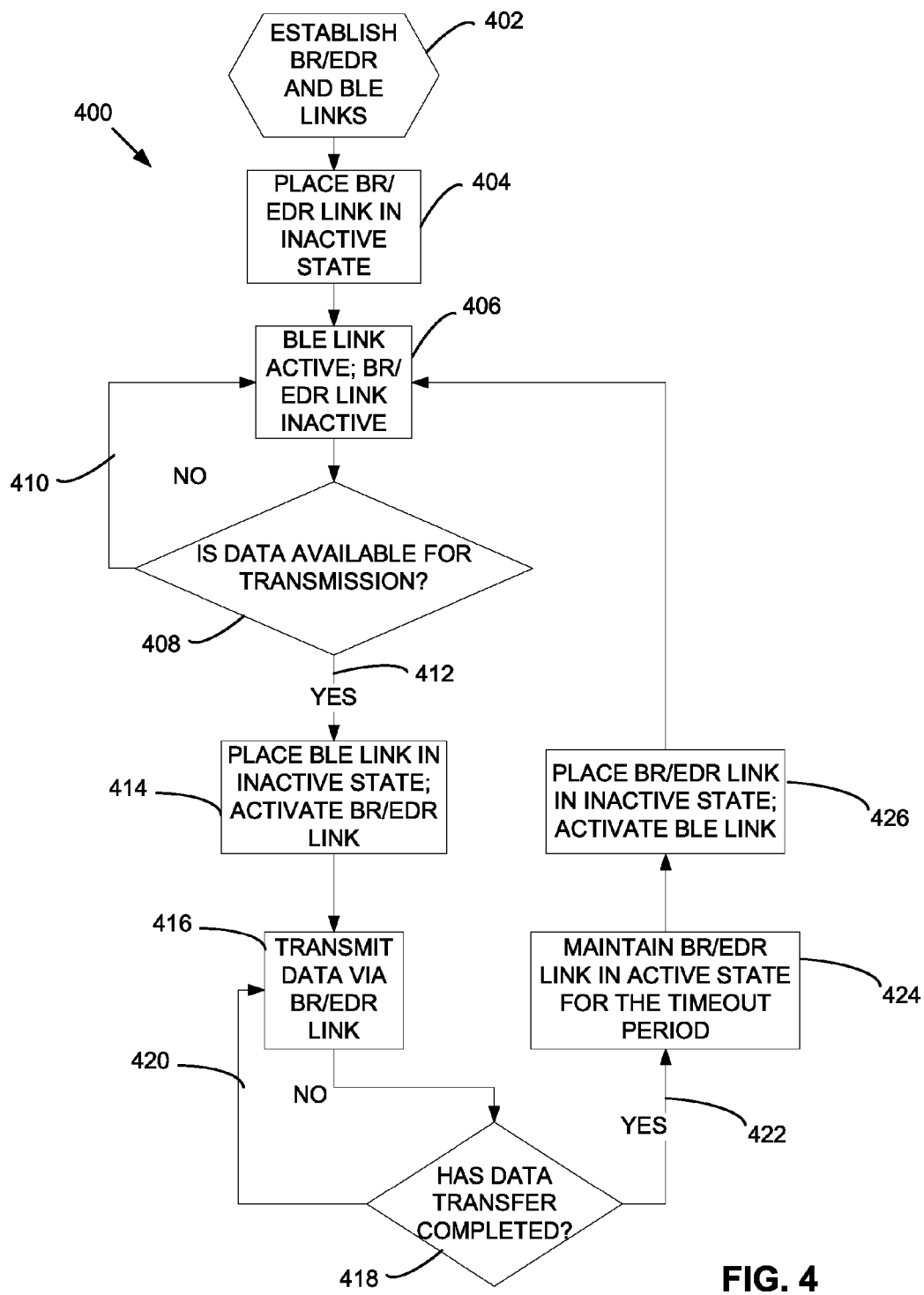
FIG. 4 is a flowchart of a procedure for power-efficient Bluetooth data transfer in accordance with some embodiments.

FIG. 4 is a flowchart of the Power-Efficient Bluetooth Data Transfer Procedure 400 in accordance with some embodiments. The Power-Efficient Bluetooth Data Transfer Procedure 400 may be performed by a wireless communication device, such as first Bluetooth device 102, although this is not a requirement as other devices may be configured to perform the Power-Efficient Bluetooth Data Transfer Procedure 400. In one embodiment, first Bluetooth device 102 begins by establishing 402 the BLE link 106 and the BR/EDR link 108 between the first Bluetooth device 102 and the second Bluetooth device 104. After the BLE link 106 and the BR/EDR link 108 have been established 402, first Bluetooth device 102 places into an inactive state 404 the BR/EDR link 108. Thus, the first Bluetooth device 102 and the second Bluetooth device 104 are in state 406 where the BLE link 106 is active and the BR/EDR link 108 is inactive.

In these embodiments, first Bluetooth device 102 may then check if data is available for transmission 408 to the second Bluetooth device 104. In one embodiment, this check may be performed by a blocking poll. In another embodiment, this check may be performed by means of a non-blocking interrupt. If no data is available for transmission 410 from the first Bluetooth device 102 to the second Bluetooth device 104, first Bluetooth device 102 stays in the state 406, where the BLE link 106 is active and the BR/EDR link 108 is inactive. If data is available for transmission 412 from the first Bluetooth device 102 to the second Bluetooth device 104, first Bluetooth device 102 places the BLE link 106 into an inactive state 414 and places the BR/EDR link 108 into an active state 414. First Bluetooth device 102 then transmits 416 data via the BR/EDR link 108 to the second Bluetooth device 104. In some embodiments, upon data transfer completion 422, first Bluetooth device 102 maintains the BR/EDR link 108 in an active state for a timeout period 424. After passage of the timeout period, first Bluetooth device 102 places the BR/EDR link 108 into an inactive state 426 and activates the BLE link 106. Thus, the first Bluetooth device 102 and the second Bluetooth device 104 are again in state 406 where the BLE link 106 is active and the BR/EDR link 108 is inactive.

Many conventional Bluetooth devices, such as mice, keyboards, etc., are characterized by short, high-throughput bursts of data and long, idle periods of no data transmission. Conventional Bluetooth wireless communication, using either the BR or EDR protocols, has high data throughput but uses a significant amount of power, making BR/EDR unsuitable for use during the long, idle periods of no data transmission. Bluetooth wireless communication using the BLE protocol uses much less power than BR/EDR but has low data throughput, making BLE not suitable for transmitting short, high-throughput bursts of data. Switching the wireless link from BLE to BR/EDR when data is available for transmission is not a viable option because reestablishing the BR/EDR connection in the traditional way, which prevents data transfer until the BR/EDR connection is reestablished, may take too much time for the users of many Bluetooth devices.

In accordance with embodiments, a pair of Bluetooth devices communicating with each other may maintain a BLE link 106 and a BR/EDR link 108, and synchronize the clocks and radio frequencies of both devices via the BLE link 106. Using the BLE link 106 to synchronize the clocks of both devices and maintain the BLE link 106 may allow the devices to switch quickly from using the BLE link 106 to using the BR/EDR link 108 for high-throughput data transfer. Accordingly, Bluetooth devices may benefit from the low power requirements of the BLE protocol and the high-throughput data transfer capabilities of the BR/EDR protocol.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method performed by a first communication device, the method comprising:
  establishing two wireless links with a second communication device, a first wireless link conducted according to a first protocol and utilized to maintain a second wireless link, the second wireless link conducted according to a second protocol to transport content data;
  placing the second wireless link into an inactive state via an inactivation command transmitted over the first wireless link to the second communication device;
  maintaining a connection between the first communication device and the second communication device by synchronizing, over the first link, a clock of the first communication device with a clock of the second communication device;
  when content data is available for transmitting, transmitting an activation command over the first wireless link to the second communication device to activate the second wireless link;

activating the second wireless link upon receipt of an acknowledgement of the activation command, the activating including placing the second wireless link into an active state and placing the first wireless link into an inactive state; and transmitting the content data to the second communication device over the second wireless link.

2. The method of claim 1, wherein the method is performed by a Human Interface Device.

3. The method of claim 1, wherein the second communication device is a Bluetooth controller of a computing device.

4. The method of claim 1, wherein:
the first protocol is a Bluetooth Low Energy (BLE) protocol; and
the second protocol is a Bluetooth Basic Rate/Enhanced Data Rate (BR/EDR) protocol.

5. The method of claim 1, wherein activating the second link includes switching an antenna of a device to operate in accordance with the second protocol.

6. The method of claim 1, further comprising:
deactivating the second link upon completion of the data transfer and passage of a timeout period, the deactivating including reverting back to the first link, returning the second link to the inactive state, and maintaining the second link in the inactive state via the first link.

7. The method of claim 1, wherein the method further comprises configuring the first link to have a lower duty cycle than the second link.

8. A method performed by a first communication device, the method comprising:
establishing two wireless links with a second communication device, a first wireless link conducted according to the Bluetooth Low Energy (BLE) protocol and utilized to maintain a second wireless link, the second wireless link conducted according to the Bluetooth Basic Rate/Enhanced Data Rate (BR/EDR) protocol to transport content data;
placing the second wireless link into an inactive state via an inactivation command transmitted over the first wireless link to the second communication device;
maintaining a connection between the first communication device and the second communication device by synchronizing, over the first link, a clock of the first communication device with a clock of the second communication device;
when content data is available for transmitting, transmitting an activation command over the first wireless link to the second communication device to activate the second wireless link;
activating the second wireless link upon receipt of an acknowledgement of the activation command, the activating including placing the second wireless link into an active state and placing the first wireless link into an inactive state; and
transmitting the content data to the second communication device over the second wireless link.

9. The method of claim 8, wherein the method further comprises configuring the BLE link to have a lower duty cycle than the BR/EDR link.

10. A wireless communication device, the device configured to:
establish two wireless links with a second communication device, a first wireless link conducted according to a first protocol and utilized to maintain a second wireless link, the second wireless link conducted according to a second protocol to transport content data;
place the second wireless link into an inactive state via an inactivation command transmitted over the first wireless link to the second communication device;
maintaining a connection between the first communication device and the second communication device by synchronizing, over the first link, a clock of the first communication device with a clock of the second communication device;
when content data is available for transmission, transmit an activation command over the first wireless link to the second communication device to activate the second wireless link;
activate the second wireless link upon receipt of an acknowledgement of the activation command, the activating including placing the second wireless link into an active state and placing the first wireless link into an inactive state; and
transmit the content data to the second communication device over the second wireless link.

11. The wireless communication device of claim 10, wherein the device is a Human Interface Device.

12. The wireless communication device of claim 10, wherein the second communication device is a Bluetooth controller of a computing device.

13. The wireless communication device of claim 10, wherein:
the first protocol is a Bluetooth Low Energy (BLE) protocol; and
the second protocol is a Bluetooth Basic Rate/Enhanced Data Rate (BR/EDR) protocol.

14. The wireless communication device of claim 10, wherein activating the second link includes switching an antenna of the device from operating in accordance with the first protocol to operating in accordance with the second protocol.

15. The wireless communication device of claim 10, further configured to:
deactivate the second link upon completion of the data transfer and passage of a timeout period, the deactivating including reverting back to the first link, returning the second link to the inactive state, and maintaining the second link in the inactive state via the first link.

16. The wireless communication device of claim 10, further configured to:
configure the first link to have a lower duty cycle than the second link.

17. The wireless communication device of claim 10, wherein the first link is configured in accordance with a Bluetooth Low Energy (BLE) protocol and utilized to maintain a second link, the second link is configured in accordance with a Bluetooth Basic Rate/Enhanced Data Rate (BR/EDR) protocol to transport content data.

18. The method of claim 8, wherein the method is performed by a Human Interface Device.

19. The method of claim 8, wherein activating the second link includes switching an antenna of a device to operate in accordance with the second protocol.

20. The method of claim 8, further comprising:
deactivating the second link upon completion of the data transfer and passage of a timeout period, the deactivating including reverting back to the first link, returning the second link to the inactive state, and maintaining the second link in the inactive state via the first link.

* * * * *